United States Patent [19]
Matumoto et al.

[11] 3,855,390
[45] Dec. 17, 1974

[54] PROCESS FOR PURIFYING A GAS CONTAINING HYDROGEN CYANIDE

[75] Inventors: Mituaki Matumoto; Tadayoshi Aono, both of Himeji, Japan

[73] Assignee: Nippon Steel Corporation, Tokyo, Japan

[22] Filed: Oct. 13, 1972

[21] Appl. No.: 297,264

[30] Foreign Application Priority Data
Oct. 18, 1971 Japan.............................. 46-82233

[52] U.S. Cl................... 423/236, 210/63, 423/166, 423/220, 423/545, 423/555
[51] Int. Cl........ C01b 3/04, C01b 3/20, C02b 1/28, C01f 11/46
[58] Field of Search.......... 423/236, 366, 545, 546, 423/550, 555, 166; 210/1, 60, 63

[56] References Cited
UNITED STATES PATENTS

| | | | |
|---|---|---|---|
| 705,152 | 7/1902 | Smith et al.................. | 423/366 |
| 1,932,819 | 10/1933 | Hansen....................... | 423/546 |
| 1,854,511 | 4/1932 | Hansen....................... | 423/366 |
| 2,795,544 | 6/1957 | Williams..................... | 210/63 |
| 2,819,950 | 1/1958 | Patton........................ | 423/573 |
| 2,459,464 | 1/1948 | Smith......................... | 210/63 |
| 1,908,515 | 5/1933 | Keller......................... | 423/366 |

FOREIGN PATENTS OR APPLICATIONS

| | | | |
|---|---|---|---|
| 525,811 | 6/1956 | Canada........................ | 423/238 |
| 1,005,047 | 9/1957 | Germany...................... | 423/366 |
| 359,004 | 10/1931 | Great Britain................ | 423/366 |
| 399,778 | 1/1932 | Great Britain................ | 423/236 |
| 1,764 | 1/1906 | Great Britain................ | 423/366 |

*Primary Examiner*—Oscar R. Vertiz
*Assistant Examiner*—Brian E. Hearn
*Attorney, Agent, or Firm*—Toren, McGeady and Stanger

[57] ABSTRACT

Process for purifying a gas containing hydrogen cyanide wherein the gas is brought into contact with an alkaline absorbing solution containing polysulfides to remove hydrogen cyanide in the form of thiocyanates, comprising withdrawing a side stream of the solution in order to maintain the pH of the absorbing solution above 7.7, supplying the side stream with a gas containing more than 2 moles of free oxygen per mole of thiocyanate in the stream thermally treating the stream at a temperature above 150°C and under such a pressure as to keep the reaction mixture in the liquid phase and thereby hydrothermally oxidizing the thiocyanates.

5 Claims, 2 Drawing Figures

PROCESS FOR PURIFYING A GAS CONTAINING HYDROGEN CYANIDE

The present invention relates to a process for purifying a gas containing hydrogen cyanide such as coke oven gas and petroleum decomposition gas, in such a manner as to avoid the waste absorbing solution becoming a source of pollution.

Removing hydrogen cyanide from a gas has been a problem for a long time in the gas industry in order to eliminate the toxicity of gas supplied as city gas, or to avoid contamination of water by dissolved hydrogen cyanide when a gas containing hydrogen cyanide is brought into contact with water.

One of the used methods is to dissolve cyanide in the form of a salt thereof by merely treating the gas with alkali, which, however, does not meet the purpose because the toxicity of the hydrogen cyanide is not eliminated. On the other hand, a newly developed method is to extract hydrogen cyanide in the form of thiocyanates by reacting it with polysulfides.

Thiocyanates, being almost non-toxic, in contrast to cyanides, cause no problems in gases or aqueous solutions containing them.

Reactions in which cyanides is converted into thiocyanates are shown below with ammonium and sodium salts as example.

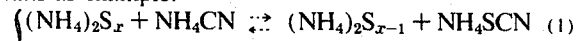
$$(NH_4)_2S_x + NH_4CN \rightleftharpoons (NH_4)_2S_{x-1} + NH_4SCN \quad (1)$$
$$(NH_4)_2S_{x-1} + S \rightleftharpoons (NH_4)_2S_x \quad (2)$$

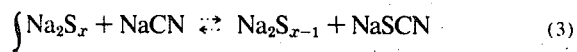
$$Na_2S_x + NaCN \rightleftharpoons Na_2S_{x-1} + NaSCN \quad (3)$$
$$Na_2S_{x-1} + S \rightleftharpoons Na_2S_x \quad (4)$$

To remove hydrogen cyanide in a gas, the gas is washed with an alkaline solution containing ammonia, caustic alkali or alkali carbonates, whereby hydrogen cyanide is fixed as salts and converted into thiocyanates according to the equations above. If the reaction is not completed in the absorber, a reaction tank may be added to bring the reaction to completion.

The solution containing the formed thiocyanates has been usually disposed of as waste water, which does not cause serious pollution because of almost negligible toxicity of thiocyanates. However, under the new standards of pollution control, it is not only important to avoid toxic matter, but also, to decrease the COD.

Thus, since thiocyanates are reducing substances showing a very high COD, the waste water from the above gas treatment process cannot be disposed of as it is. Since the the problem remains unsolved, the purifying scheme for a gas containing hydrogen cyanide also remains incomplete.

The present invention relates to a process for decomposing a waste solution containing thiocyanates delivered from a process for removing hydrogen cyanide, eliminating toxicity and reducing the COD value almost to zero. Thus, the present invention has completed a process for purifying a gas containing hydrogen cyanide based on the thiocyanate method.

In the first place, the process for absorbing hydrogen cyanide in a gas in the form of thiocyanates will be explained in detail. Sulfur or polysulfides are supplied in two methods.

Figure 1:
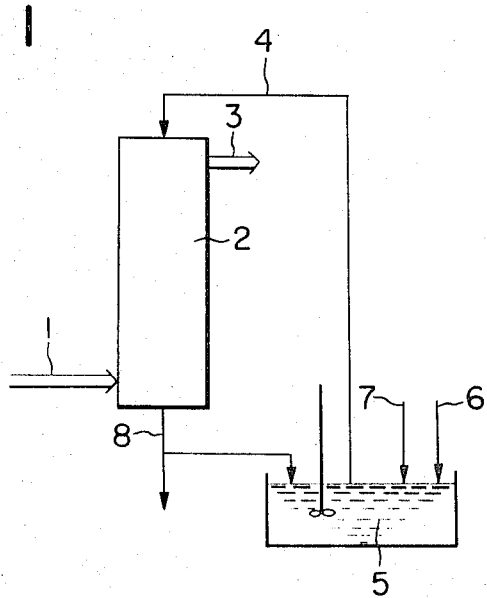
FIGS. 1 and 2 show the process in which hydrogen cyanide in a gas is absorbed in the form of thiocyanates, where 1, gas containing hydrogen cyanide; 2, absorber; 3, outlet for gas; 4, absorbing solution; 5, reaction tank; 6, sulfur; 7, alkali; 8, pipe path for the circulating solution; 9, tank for staying; 10, pipe path; 11, apparatus for oxidizing; 12, air; 13, pipe path; 14, filter; 15, sulfur; 16, waste water; 17, catalyst and 18, water and alkali.

In one of the methods, as it is shown in FIG. 1, a gas 1, while flowing from the absorber 2 to the outlet 3, is brought into contact with an absorbing solution 4 (designated hereinafter also as a circulating solution). The circulating solution 4 is an aqueous alkaline solution containing polysulfides, in which hydrogen cyanide in the gas is absorbed. While the solution is being circulated, sulfur 6 is supplied in the reaction tank 5 from outside of the system, causing the reactions (2) and (4). The solution with replenished polysulfides is transferred to the abosorber 2. Alkalis 7 may include caustic alkali, alkali carbonates. However, when the gas contains a basic substance, such as, ammonia, it may be used as source of alkaline substance. In the absorber 2, hydrogen cyanide is fixed by the alkali with simultaneous occurrence of thiocyanates formation according to equations (1) and (3), which eventually remove hydrogen cyanide from the gas. The reactions (1) and (3) partly continue in the reaction tank 6. A fraction of the circulating solution is taken out of the system as waste water 8 (designated hereinafter as extracted solution).

Figure 2:
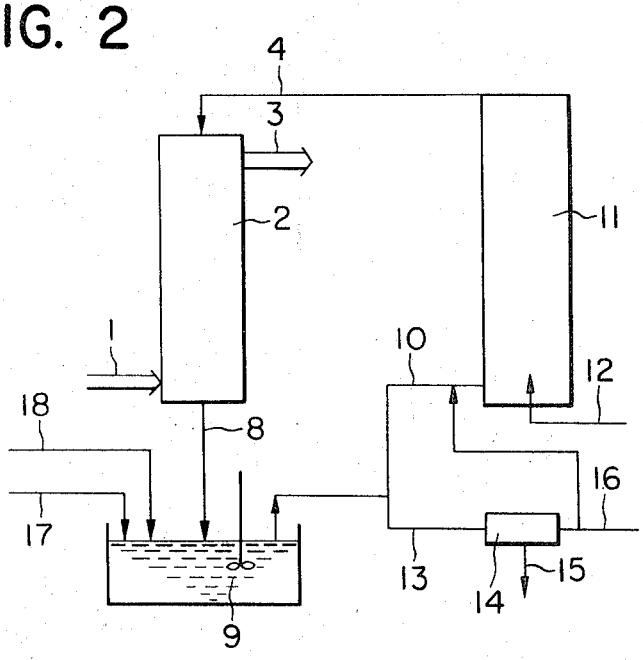

On the other hand, if the gas to be treated contains hydrogen sulfide along with hydrogen cyanide, the former is utilized, as is usually the case, as the source of sulfur necessary for the de-hydrogen cyanide reactions. A generally applied process along this line is shown in FIG. 2. While a gas 1 is transferred via the absorber 2 to the outlet 3, the gas is brought into contact with the circulating solution 4 in the absorber 2, whereby both hydrogen cyanide and hydrogen sulfide are absorbed in the solution 4 as cyanides, thiocyanides or sulfides. The circulating solution is transferred, via the pipe path 8, tank for staying 9 and the pipe path 10, to the oxidizing vessel 11, where sulfides are oxidized to sulfur and the catalyst in the solution is oxidizingly regenerated by contact with air 12 and the solution is again fed to the absorber tower 2. A fraction of the circulating solution is taken out of the system through the pipe path 13, and, if excessive sulfur is contained, the sulfur 15 is recovered by treating with the filter 14 and the larger part of the filtrate is fed to the circulating solution, but a small part thereof is taken out as a waste 16. In the tank for staying 9, catalyst 17, water and alkali 18 are added to the circulating solution. In some process, however, these substances are added in the pipe path instead of in a tank for staying.

The absorbing solution is an alkaline solution containing so-called redox catalyst having oxygen-transfer capability, such as, derivatives of quinone, naphthoquinone, phenanthrenequinone and picric acid. These catalysts oxidize sulfide into sulfur and therefore are widely used to remove hydrogen sulfide. When both hydrogen cyanide and hydrogen sulfide are simultaneously present in a gas, the sulfur formed by the reaction can be used as source of sulfur necessary for forming polysulfides, and thus the sulfur in the circulating solution reacts with the alkali to form polysulfides which reacts with hydrogen cyanide. Generally the absorption rate of hydrogen cyanide is larger than that of hydrogen sulfide, therefore the former is more rapidly absorbed than the latter. As a result, hydrogen cyanide is necessarily removed by absorption in the form of thiocyanates in this kind of de-sulfuring process. In conclusion there exists the same kind of water pollution troubles as above in the process for removing hydrogen sulfide.

Taking, for example, a sodium carbonate solution system containing sodium naphthoquinonesulfonate, the main reactions appearing in this system are as follows:

Absorption reactions $$Na_2CO_3 + H_2S = NaHS + NaHCO_3 \quad (5)$$

$$Na_2CO_3 + HCN = NaCN + NaHCO_3 \quad (6)$$

Oxidation reaction

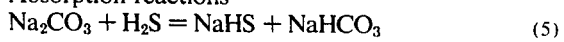
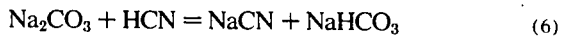

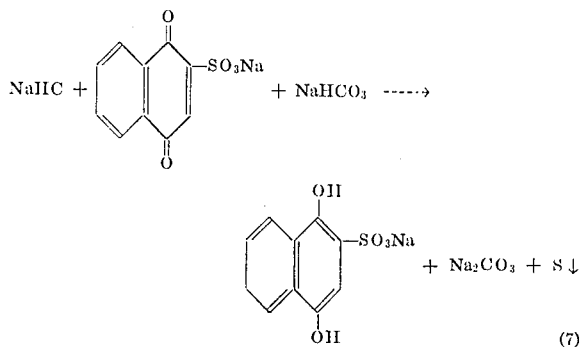

Thiocyanation reaction $$NaCN + Na_2S_x \longrightarrow NaSCN + Na_2S_{x-1} \quad (8)$$

Polysulfide formation reaction $$Na_2S_{x-1} + S \longrightarrow Na_2S_x \quad (9)$$

Catalyst regeneration reaction (oxidation)

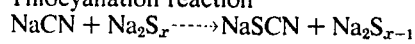
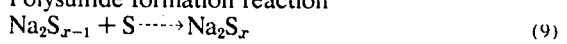
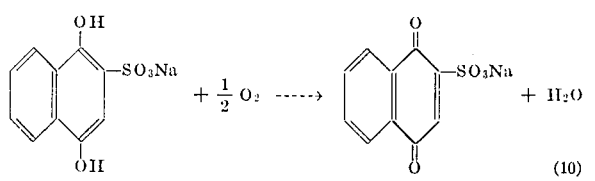

The absorbing solution is an aqueous alkaline solution containing catalyst and other substances involved in the above reactions, the alkali consisting of caustic alkalis, alkali carbonates and ammonia contained in the gas. The absorption reactions and the catalyst regeneration reaction take place in the absorber and the oxidation vessels, respectively, but other reactions, such as, the thiocyanation reaction are presumed to take place successively everywhere in the system. The exhausted absorbing solution should be continuously or intermittently taken out of the system as a waste water, and excessive sulfur should be removed by filtration.

Reactions in which hydrogen cyanide in a gas is involved, in both FIGS. 1 and 2, are those of fixation of hydrogen cyanide by an alkali and of thiocyanates formation by polysulfides and of polysulfides formation as shown by Equations (1) through (4).

In the conventional processes for removing hydrogen cyanide or a mixture thereof with hydrogen sulfide, the most serious problems are the deterioration of the absorbing solution and the method to treat the extracted waste water such as shown as 8 in FIG. 1 and 16 in FIG. 2. The most important cause of deterioration of the absorbing solution, though many causes are thought of, are due to accumulation of thiocyanates. For example, as thiocyanates are increased in the absorbing solution in the reactions expressed by (1) and (3), the pH of the solution is gradually decreased, hence the efficiency of eliminating hydrogen cyanide is also lowered. Since the pH of the absorbing solution is determined by concentrations of not only thiocyanates, but alkalis and by-products as thiosulfates produced by side reactions, the concentrations of these substances should be desirably controlled by the pH. According to the present inventors' experience, pH of the absorbing solution of this invention should be controlled to be not below 7.7, preferably above 8.0, because the efficiency of eliminating hydrogen cyanide and hydrogen sulfide is extremely reduced at a pH below 7.7.

To minimize the COD of the extracted solution which contains non-toxic thiocyanates or to reduce the COD to zero is important in the present invention. An extracted solution containing 100 g/l of thiocyanates (as SCN) usually shows a COD close to 100,000 ppm, and further in a system shown in FIG. 2 in which hydrogen sulfide is absorbed simultaneously, the COD value is much larger because sulfur is oxidized to thiosulfates and others which also have a high COD. These are a serious origin of high COD.

Even if the waste solution is disposed of after dilution, thousands volumes to ten thousands of unpolluted water are required, which will make the treatment practically impossible. The active sludge process which is universally employed for treating exhaust water containing organic materials acts very slowly toward inorganic substances, and therefore a large scale of treating facilities and expenses are needed. Chemical treatment employing an oxidant, such as, chlorine is not economical for a waste water of high COD because a large amount of expensive chemicals is required. Thus, treatment of the waste water to lower the COD has been the most serious problem in the process for removing hydrogen cyanide.

Considering that oxidation of reductive thiocyanates or other sulfur compounds to the state in which oxygen is no longer demanded is the most suitable approach, the present inventors have investigated the use of free oxygen, such as, air, as an oxidant and found that high temperature treatment of a thiocyanates solution in the presence of free oxygen and water readily decomposed the thiocyanates and the COD vanished almost completely. In this treatment, 2 moles of each of the free oxygen and water were needed per mole of thiocyanates and the higher the temperature, the more rapid the reaction. In this invention the temperature is maintained above 150°C, preferably above 200°C. In order to keep water in the liquid state during the reaction with thiocyanates, the applied pressure should be higher than the vapor pressure of water.

According to the inventors' investigation, reactions expressed by the following equations proceed almost quantitatively when thiocyanates are hydrothermally oxidized under the described conditions:

$$NaSCN + 2O_2 + 2H_2O \rightarrow Na(NH_4)SO_4 + CO_2 \quad (11)$$

$$NH_4SCN + 2O_2 + 2H_2O \rightarrow (NH_4)_2SO_4 + CO_2 \quad (12)$$

Since in the reactions sulfur and carbon atoms in the thiocyanates are completely oxidized to sulfate and carbon dioxide, respectively, and nitrogen atom is converted into ammonia and, as a result, the COD of the solution almost vanishes.

The treatment can be expressed as follows in connection with FIGS. 1 and 2: A part of the circulating solution, which is extracted while chemicals are being supplied to maintain pH of the circulating solution above 7.7, preferably above 8.0, is transferred to a thermal treatment vessel, mixed with a gas such as air containing free oxygen so as to supply more than 2 moles of oxygen per mole of thiocyanates, and is heated at a temperature above 150°C, preferably above 200°C under a pressure exceeding the vapor pressure of water. Time of reaction differs according to the temperature at which the solution is heated. Ten hours at a low temperature, but less than 30 minutes at a temperature over 250°C is required.

Extraction of a part of the circulating solution may be made either continuously or intermittently, but, when a large volume of gas is treated and the solution to be extracted is of a large volume, continuous extraction results in a more stable pH value of the solution. The hydrothermally oxidized solution thus resulting has almost no COD value and may be disposed of without further treatment. The reaction products from the reactions of equations (11) and (12) may be utilized, depending on the kind and concentration of alkaline substances contained, as a source of ammonium sulfate and sodium sulfate to make better use of natural resources. Furthermore, gypsum may be recovered from the hydrothermally oxidized solution by adding lime, slaked lime or calcium carbonate. The addition of lime, slaked lime or calcium carbonate also neutralizes sulfate ions which have been produced by the hydrothermal oxidation of thiocyanates, and therefore is effective to avoid corrosion of the thermal treatment vessel by sulfate ions.

Thus, hydrogen cyanide or both hydrogen cyanide and hydrogen sulfide in a gas can be removed, without trouble, by first absorbing hydrogen cyanide in the solution in the form of thiocyanates and then hydrothermally oxidizing thiocyanates in the waste solution at a high temperature.

EXAMPLE 1

A stream of hydrogen containing 1.70 g/m³ of HCN, 8.0 g/m³ of $NH_3$ and 4.5 g/m³ of $H_2S$ was flowed through the apparatus as shown in FIG. 1 at the flow rate of 10 m³/H and allowed to come into contact with 100 l/H of an absorbing solution. Alkali was not fed in from outside, but the $NH_3$ in the gas was sufficient. Sulfur was supplied in the reaction tank so as to maintain the sulfur content of the circulating solution at 11 g/l to form polysulfides. The circulating solution was continuously extracted at a speed of 0.13 l/H from the bottom of the absorber. The solution maintained a pH at 8.6 and the concentration of thiocyanates at 123 g/l as SCN and 90 percent of the hydrogen cyanide in the gas has been removed. The COD value of the waste solution was 200,000 ppm. Per liter of the extracted solution thereof, 1,250 Nl of air was introduced into an autoclave and reaction took place for 120 min. at 185°C under 30 atmospheres. COD of the cooled solution was found to have been reduced to 100 ppm.

A waste solution showing this level of COD needs only to be diluted tenfold with pure water to reduce the COD to 10 ppm which is well below the regulation limit of a waste water.

EXAMPLE 2

A coke oven gas containing 1.5 g/m³ of HCN, 5 g/m³ of $H_2S$ and 8 g/m³ of $NH_3$ was flowed through an apparatus as shown in FIG. 2 at a speed of 22 m³/H and to come into contact with 300 l/H of an absorber solution (or circulating solution). To the circulating solution, a 0.450 mol/l solution of sodium naphthoquinonesulfonate and a 5 percent solution of NaOH were continuously added at the rates of 15 g/H and 1.1 l/H, respectively, and air was introduced into the oxidizing tower at a rate of 1 m³/H. A part of the circulating solution was extracted and sulfur in it was removed by filtration. The filtrate was obtained at a rate of 800 g/H. The circulating solution and the filtrate therefrom showed a pH 9.2 and the concentrations of thiocyanates and thiosulfates were 80 g/l as SCN and 30 g/l as $S_2O_3$, respectively. Hydrogen cyanide and hydrogen sulfide were removed by 97 percent and 94 percent, respectively, of the original gas. The extracted solution and 1,400 Nl/H of air were introduced into a heating apparatus (thermal treatment vessel) under a continuously increasing pressure and continuously treated at the reaction temperature 260°C under a pressure of 60 atm. during a stay period of 30 min. thiocyanate thiosulfate polysulfides and sulfur are all decomposed to sulfates. As the result the COD values, being 120,000 ppm at the inlet of the reactor were reduced to 30 ppm at the outlet.

EXAMPLE 3

In a process according to Example 2, 10 percent emulsion of lime was added to the same extracted solution as in Example 2 at the rate of 900 g/H into the heating apparatus, and treated with the mean stay period of 14 min., other conditions, such as, volume of air, reaction temperature and pressure being the same. The reaction mixture coming out from the outlet of the reactor was accompanied by 213 g/H of gypsum. The COD value of the solution at the outlet was 14 ppm.

What is claimed is:

1. A method for reducing the COD level of an aqueous solution containing thiocyanate comprising oxidizing the thiocyanate present by mixing the solution with a gas containing free oxygen such that there are more than two moles of free oxygen present for each mole of thiocyanate in the solution and heating the mixture at a temperature of at least 150°C and a pressure sufficient to maintain the reaction mixture in the liquid phase.

2. The process of claim 1, wherein lime, slaked lime, or calcium carbonate, is added to the aqueous solution such that gypsum is produced during the pressurized heating step and the gypsum produced is removed from the final product mixture.

3. The process of claim 1, wherein the aqueous solution containing thiocyanate is an alkaline solution used as an absorption liquid for the removal of hydrogen cyanide from a gas by scrubbing the gas with an alkaline solution containing polysulfides to convert the hydrogen cyanide to thiocyanate.

4. The process of claim 3, wherein the scrubbing solution is prepared by supplying sulfur to an alkaline aqueous solution.

5. The process of claim 4, wherein the sulfur is supplied by the presence of hydrogen sulfide in the gas.

* * * * *